J. L. SHEPPARD.
Assignor by mesne assignments of one-half interest to M. H. G. Sheppard.
COTTON-BALE TIE.
No. 7,546. Reissued March 6, 1877.
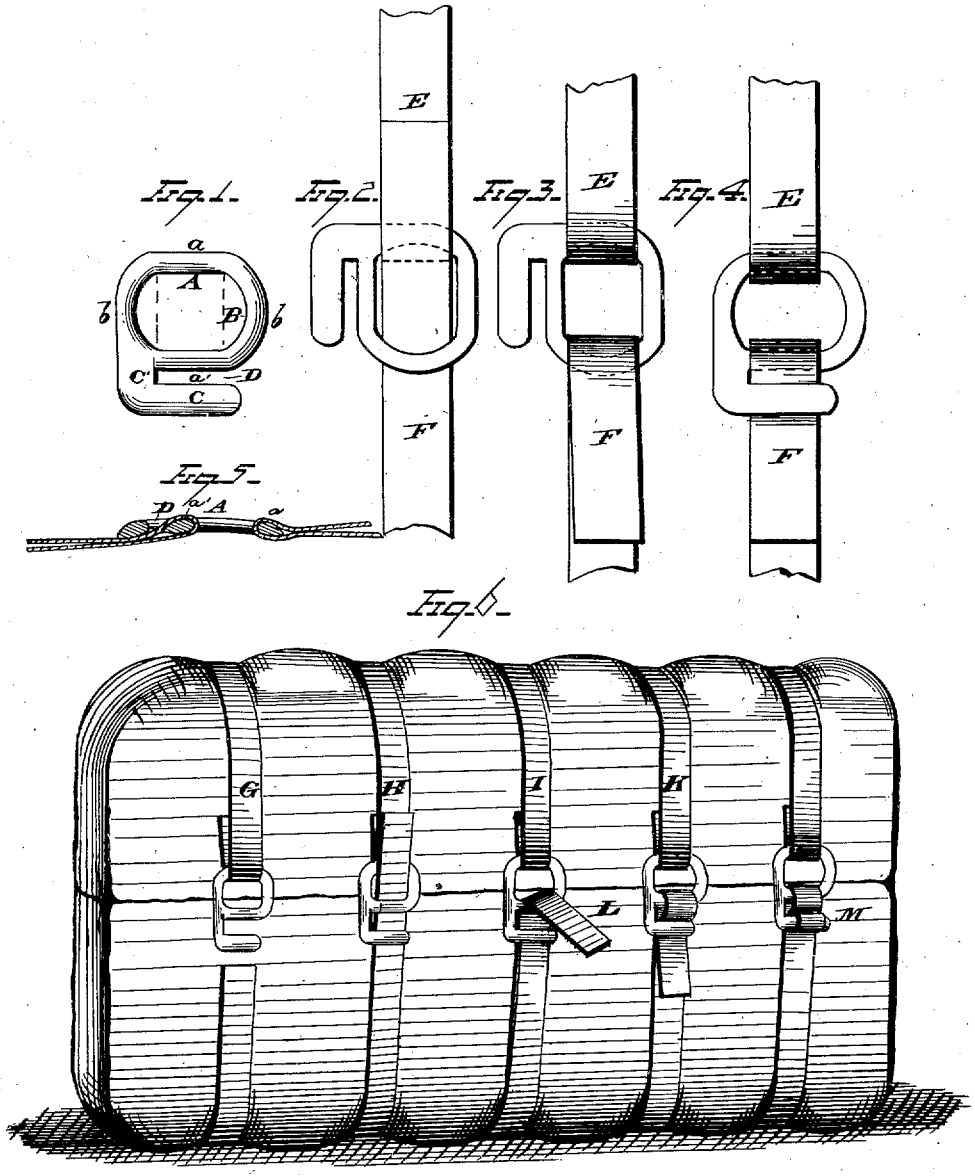
WITNESSES
Ed. S. Nottingham.
A. N. Bright.
INVENTOR
J. L. Sheppard.
By H. A. Seymour.
ATTORNEY

UNITED STATES PATENT OFFICE.

JOHN L. SHEPPARD, OF CHARLESTON, SOUTH CAROLINA, ASSIGNOR, BY MESNE ASSIGNMENTS, OF ONE-HALF INTEREST TO MARGARET H. G. SHEPPARD.

IMPROVEMENT IN COTTON-BALE TIES.

Specification forming part of Letters Patent No. 75,705, dated March 17, 1868; reissue No. 7,546, dated March 6, 1877; application filed February 15, 1877.

*To all whom it may concern:*

Be it known that I, JOHN L. SHEPPARD, of Charleston, in the county of Charleston and State of South Carolina, have invented a new and Improved Cotton-Bale Tie; and I do hereby declare the following to be a full, clear, and exact description of the same, reference being had to the accompanying drawings, forming part of this specification.

My invention relates to an improved cotton-bale tie; the object of the same being to produce a buckle of such shape and construction that the ends of a band or hoop may be readily and securely attached to the buckle, with the expenditure of the least possible amount of power, and to obviate the necessity of any slack band in locking the tie.

Figure 1 is a plan view of my improved buckle. Fig. 2 shows the buckle, having one end of the band looped around one bar of the buckle, while the opposite end is passed through the ring preparatory to being turned backwardly and secured. Fig. 3 represents both ends looped over the ring of the buckle. Fig. 4 is a plan view of the tie properly secured. Fig. 5 is a longitudinal vertical section through the buckle and band. Fig. 6 shows a bale, the bands of which are represented as having my improved buckle combined therewith.

In the drawings, A designates the buckle, which may be made of cast or wrought metal, and of any desired material—as, for instance, the buckle may be constructed of cast or wrought iron, steel, or brass. Buckle A is composed of a single piece of material, and consists of the ring portion B and arm C, the latter provided with a shoulder, C′, which joins the ring portion B, to form an opening, D, of such width that the free end of the band may pass diagonally into the same.

Part B of the buckle is formed with parallel end bars *a a′*, equal in length to the width of the band or hoop employed, and also separated sufficiently to allow a band equal in width to the length of the bars to be turned within the ring portion of the buckle, at right angles to said bars *a a′*. The sides *b b* of the ring portion B are curved, as represented in the drawings, and for a purpose hereinafter described.

The buckle is made slightly curved in form, as shown in Fig. 5, with the bars *a a′*, sides *b b*, and arm C all outwardly beveled toward the under surface of the buckle, thus preventing any portion of the buckle from catching on any object or portion of the vessel as the bales are being loaded or unloaded. This construction also serves to dispose the least amount of metal in a form to resist the required strain exerted on the tie.

Figs. 2, 3, and 4 illustrate one method of securing the ends of the band and locking the same, which is effected by turning the buckle after the ends of the band have been looped therein. In Fig. 2 the band end E is represented as having been inserted from the upper side of the buckle, and then bent backwardly upon itself, to bring the extreme end of the band in contact with the bale. This view shows the opposite end F of the band as having been inserted through the ring portion B of the buckle from its under side. Fig. 3 shows the end F turned backwardly upon itself over the side of the buckle, thus forming a loop.

In order to secure the ends E and F without the outlay of any slack band, the buckle A is given a quarter turn or revolution, as represented in Fig. 4, and the arm C forced over the top of the free end F of the band. I am enabled to lock the tie in the manner above set forth, owing to the shape of the ring portion of the buckle, which is of sufficient size to allow the band to be placed and turned therein, and, when locked, the band is secured against lateral displacement by the sides of the buckle. The tie thus formed, as clearly shown in Fig. 5 is readily made, and, when secured, is positive and reliable in operation.

The band end F, having been inserted from the under side of bar *a*, is then turned backwardly and the free end secured beneath the arm C. As the free end F is brought in direct contact with the bar *a*, the arm C, and the upper surface of the band, and as the short bend made in the end F as it is bent over the bar *a* and beneath the arm C all tend to increase the frictional contact between the several parts composing the tie, it is practically impossible for the band to slip or become disengaged from the buckle.

Fig. 6 represents a bale provided with bands, the ties of the same being shown as they exist during the several and successive stages of being joined and finally secured without turning the buckle, but by reeving the free end of the band beneath the arm of the buckle. Band lettered G shows one end of the band looped over and secured to one arm of the buckle, while the opposite end of the band remains loose. Band H represents one end of the band as secured to the buckle, while the opposite end has been inserted through the buckle from its under side and drawn through preparatory to being locked.

Heretofore, buckles have been made so that the free end of the loop could be inserted laterally through an open slot into the buckle; but in such instances the closed slot of the buckle has been made of greater length than the open slot for the following reason: After the band had been inserted through the narrow closed slot, it was practically impossible to twist the band within the slot in order to insert the free end of the band through the open slot of the buckle. This difficulty necessitated the making of the narrow closed slot of greater length than the open slot, so that the entire band could be forced in a lateral direction, in order to allow the free end to be inserted laterally into the open slot of the buckle. This latter construction was objectionable, for the reason that, after the free end of the band had been inserted into the closed slot and the slack drawn up, it required the expenditure of considerable power and a waste of time to move the band laterally in the close slot, to lock the free end of the band in the open slot.

The excellence of a tie depends, to a great extent, on the rapidity with which it may be formed. When the buckles are so formed that the band may be turned diagonally in the ring portion of the buckle, the band is secured in the shortest possible space of time.

The preferable method of locking the free end of the band is clearly shown in Fig. 6, by the bands lettered I and K. The former represents the end L of the band turned diagonally in the ring portion of the buckle, in order to clear the end of the arm C when the end L is forced beneath said arms, as shown at K. The end of the band is then turned backwardly over the arm C, as shown at M, if desired.

The main excellence of my improved buckle is due to the fact that the ring portion of the buckle is of such form that the band may be turned therein to lock the free end of the band.

Having fully described my invention, what I claim as new, and desire to secure by Letters Patent, is—

1. A bale-tie formed of a single piece of material, having a ring portion at one end, and a single arm on one side thereof, whereby an opening is formed between the ring and the arm, the ring portion of the tie being of sufficient size to allow of the turning of the band therein, substantially as and for the purpose set forth.

2. A bale-tie formed with a ring portion, the sides of which are curved, said ring portion provided with an arm for securing the free end of the band.

In testimony that I claim the foregoing I have hereunto set my hand this 13th day of February, 1877.

JOHN L. SHEPPARD.

Witnesses:
SAML. WILEY,
PHILIP B. SHAW.